(12) United States Patent
Mitchell et al.

(10) Patent No.: US 9,734,034 B2
(45) Date of Patent: Aug. 15, 2017

(54) SYSTEM AND METHOD FOR PROCESSING DATA

(75) Inventors: Guy Mitchell, Aurora, CO (US); Rolf Kubli, Zurich (CH); Max Boehm, Holzwickede (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 1490 days.

(21) Appl. No.: 12/757,112

(22) Filed: Apr. 9, 2010

(65) Prior Publication Data

US 2011/0252003 A1 Oct. 13, 2011

(51) Int. Cl.
*G06F 17/30* (2006.01)
*G06F 11/30* (2006.01)
*G06F 11/32* (2006.01)
*G06F 11/34* (2006.01)

(52) U.S. Cl.
CPC ...... *G06F 11/3006* (2013.01); *G06F 11/3079* (2013.01); *G06F 11/32* (2013.01); *G06F 11/3442* (2013.01); *G06F 17/30289* (2013.01); *G06F 17/30386* (2013.01); *G06F 17/30575* (2013.01); *G06F 17/30876* (2013.01); *G06F 11/3409* (2013.01); *G06F 2201/81* (2013.01)

(58) Field of Classification Search
CPC .................. G06F 17/30289; G06F 17/30575
USPC ....................................... 707/674
See application file for complete search history.

(56) References Cited

U.S. PATENT DOCUMENTS

| | | | |
|---|---|---|---|
| 5,751,965 A * | 5/1998 | Mayo | H04L 41/0213 709/224 |
| 5,974,572 A * | 10/1999 | Weinberg | G06F 11/32 707/E17.116 |
| 6,085,191 A * | 7/2000 | Fisher et al. | 707/737 |
| 6,594,662 B1 * | 7/2003 | Sieffert | G06F 17/3089 |
| 6,978,282 B1 * | 12/2005 | Dings et al. | 707/610 |
| 7,065,540 B2 * | 6/2006 | Chandrasekaran et al. | 707/674 |
| 7,219,300 B2 * | 5/2007 | Arquie | H04L 41/12 709/224 |
| 7,415,453 B2 * | 8/2008 | Suzuki | G06F 11/3409 |
| 7,509,591 B1 | 3/2009 | Thorn et al. | |
| 7,509,592 B1 | 3/2009 | Martinez | |
| 7,672,957 B2 * | 3/2010 | Cotichini | G06F 8/74 707/794 |

(Continued)

FOREIGN PATENT DOCUMENTS

WO  WO-2009074179  6/2009

OTHER PUBLICATIONS

Business Wire, "HP OpenView Users—A Pro Active Approach to Capacity Management front Metron-Athene.," Mar. 15, 2005, <http://www.thefreelibrary.com/HP+OpenView+Users+--+A+Pro-Active+Approach+to+Capacity+Management . . . -a0130288604>.

(Continued)

*Primary Examiner* — Mark E Hershley
(74) *Attorney, Agent, or Firm* — Hewlett Packard Enterprise Patent Department (57) ABSTRACT

According to one embodiment of the present invention there is provided a method of processing status data relating to elements of a network. The method comprises receiving status data relating to elements of the network, obtaining status data modification data, modifying at least some of the received status data in accordance with the status data modification data, and generating tree map data using the modified data.

11 Claims, 4 Drawing Sheets

(56) References Cited

U.S. PATENT DOCUMENTS

| | | | |
|---|---|---|---|
| 7,676,516 B2* | 3/2010 | Boukobza | 707/713 |
| 7,689,608 B2* | 3/2010 | Medlock | 707/674 |
| 7,822,707 B1* | 10/2010 | Yehuda et al. | 707/609 |
| 7,886,033 B2* | 2/2011 | Hopmann et al. | 709/223 |
| 2002/0035625 A1 | 3/2002 | Tanaka | |
| 2002/0052858 A1 | 5/2002 | Goldman | |
| 2003/0225563 A1 | 12/2003 | Gonos | |
| 2004/0153708 A1* | 8/2004 | Joshi | G06F 9/5088 714/47.2 |
| 2004/0169654 A1 | 9/2004 | Walker et al. | |
| 2004/0212615 A1 | 10/2004 | Uthe | |
| 2005/0171752 A1 | 8/2005 | Patrizio et al. | |
| 2005/0216421 A1* | 9/2005 | Barry et al. | 705/64 |
| 2006/0218010 A1* | 9/2006 | Michon et al. | 705/3 |
| 2006/0218301 A1 | 9/2006 | O'Toole et al. | |
| 2007/0043860 A1 | 2/2007 | Pabari | |
| 2007/0074288 A1 | 3/2007 | Chang et al. | |
| 2007/0101000 A1 | 5/2007 | Childress et al. | |
| 2007/0168500 A1 | 7/2007 | D'Souza | |
| 2007/0226640 A1* | 9/2007 | Holbrook | G06F 17/30864 715/765 |
| 2008/0092122 A1 | 4/2008 | Caprihan et al. | |
| 2008/0162239 A1 | 7/2008 | Mitchell et al. | |
| 2008/0167930 A1 | 7/2008 | Cao et al. | |
| 2008/0181110 A1 | 7/2008 | Ramakrishnan et al. | |
| 2008/0244062 A1 | 10/2008 | Elangovan et al. | |
| 2008/0266297 A1 | 10/2008 | Leah et al. | |
| 2009/0024627 A1 | 1/2009 | King | |
| 2009/0089421 A1 | 4/2009 | Boehm et al. | |
| 2009/0157699 A1* | 6/2009 | Ohata et al. | 707/10 |
| 2009/0210427 A1* | 8/2009 | Eidler et al. | 707/10 |
| 2009/0299767 A1* | 12/2009 | Michon et al. | 705/3 |
| 2010/0121822 A1* | 5/2010 | Suzuki | 707/674 |
| 2010/0121823 A1* | 5/2010 | Shiozawa et al. | 707/674 |
| 2010/0138396 A1* | 6/2010 | Kikkawa | 707/674 |
| 2010/0185591 A1* | 7/2010 | Ichikawa | 707/674 |
| 2010/0241608 A1* | 9/2010 | Huang et al. | 706/52 |
| 2011/0047127 A1* | 2/2011 | Scott et al. | 707/632 |
| 2011/0225207 A1* | 9/2011 | Subramanian et al. | 707/803 |

OTHER PUBLICATIONS

European Patent Office, Extended European Search Report, issued in European Patent App. No. 11766301, dated Apr. 9, 2015, 15 pages.

European Patent Office, Article 94(3); issued in European Patent App. No. 11766301, dated Jun. 2, 2016, 4 pages.

European Patent Office, Supplementary Partial European Search Report, issued in European Patent App. No. 11766301, dated Dec. 18, 2014, 5 pages.

International Bureau, International Preliminary Report on Patentability, issued in International Patent App. No. PCT/US2011/024692, dated Oct. 9, 2012.

International Searching Authority, International Search Report and Written Opinion, issued in International Patent App. No. PCT/US2011/024692, dated Oct. 14, 2011.

* cited by examiner

SYSTEM AND METHOD FOR PROCESSING DATA

BACKGROUND

Many enterprises and organizations have computer systems comprised of large numbers of different elements such as computer servers, storage devices, computers, processing devices, and the like. In large computer systems the number of system elements may run into the hundreds, thousands, hundreds of thousands, and beyond.

In large systems it is particularly difficult for system managers and administrators to monitor the functioning of the whole system, making it difficult to understand how the system is operating. Not surprisingly, effectively managing such systems is particularly difficult. Without effective management, such computer systems may quickly become outdated, over loaded, or otherwise no longer suitable for meeting the expected requirements.

BRIEF DESCRIPTION

Embodiments of the invention will now be described, by way of non-limiting example only, with reference to the accompanying drawings, in which.

DETAILED DESCRIPTION

Figure 1:
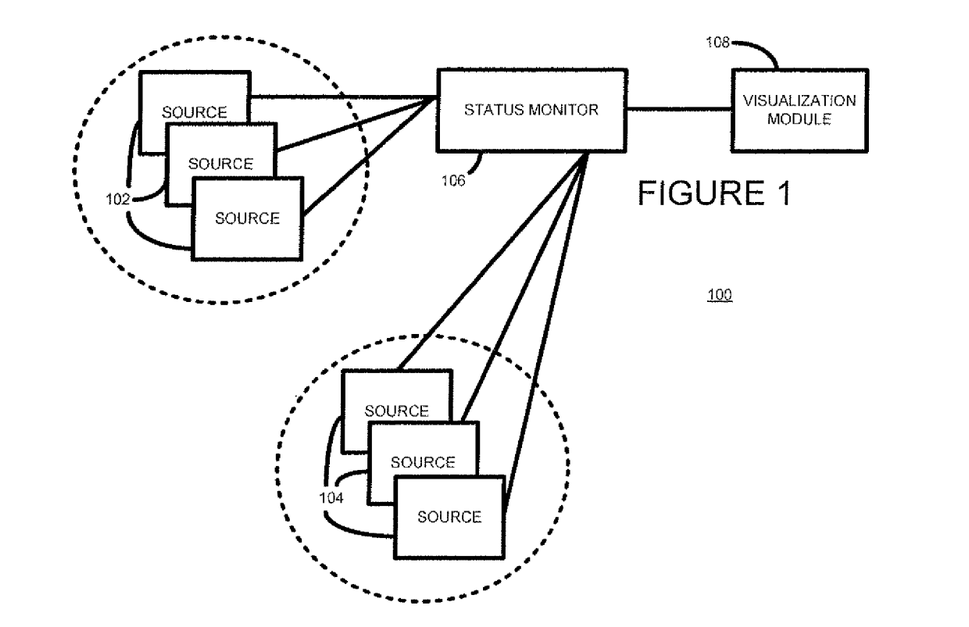
FIG. 1 is a simplified block diagram of a system according to the prior art.

Referring to FIG. 1 is shown a computer system 100 comprising a number of system elements 102 and 104, such as computer servers, storage devices, computers, and the like. For the purposes of illustration, the system elements 102 represent system elements located in a first country, such as the USA, and elements 104 represent system elements located in a second country, such as China.

Status data from each of the elements is periodically gathered or obtained by a status monitor 106. The status data may, for example, be sent periodically from a system element and received by the status monitor 106, or the status monitor 106 may poll or interrogate a system element to obtain status data therefrom. The status monitor 106 processes the obtained status data to generate tree map data. The status monitor 106 then passes, or otherwise makes available, the generated tree map data, or a portion thereof, to a visualization module 108 which produces a visual tree map output based on the processed received status data.

Tree maps or grid maps are generally known visualization techniques for concisely and clearly showing large amounts of data. Tree maps are useful in representing hierarchical status data obtained during the operation of large computer systems.

Figure 2:
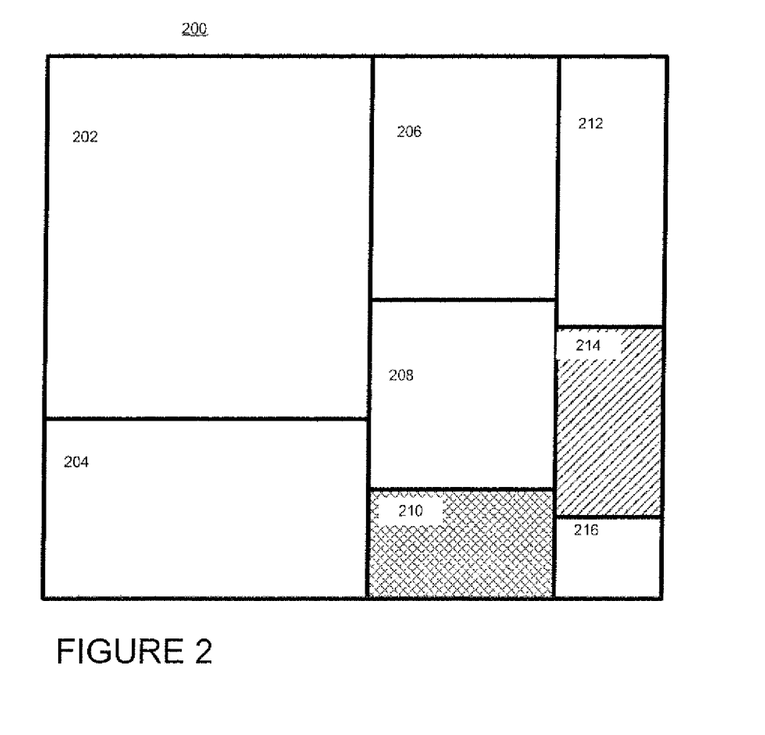
FIG. 2 is an illustration of an example visual output of the system of FIG. 1.

An example tree map 200 produced by the visualization module 108 from generated tree map data is shown in FIG. 2. The tree map 200 uses a cell structure to show a number of different cells 202 to 216. Each cell may represent a group of received status data. The size of a cell relative to the size of other cells in the tree map indicates a characteristic relative to other cells in the tree map. For example, in the tree map 200, each cell may represent the number of computer servers in a particular country of a particular global computer system. For example, cell 202 may represent the number of computer servers identified from the received status data as being located in the USA, cell 204 may represent the number of computer servers identified being located in China, and so on. The relative size of each of the cells 202 to 216 represents or indicates a characteristic of the displayed data. For instance, in FIG. 2 it can be seen, at a glance, that the size of cell 202 is approximately twice the size of cell 204. This indicates that there are approximately twice as many computer servers in the USA compared to China. The number of cells shown in a tree map may depend on the type of data being displayed.

The color or shading of each cell may also be used to represent status data relating to the status of the computer servers represented by each cell. For example, cells 210 and 214 are shown with different hatched shading. The shading or color of cell 210 may, for example, be used to indicate when a reported processor utilization is above first predetermined level, and the shading of cell 214 used to indicate when a reported processor utilization is above a second predetermined level. The color of a cell may be chosen, for example, to represent a characteristic, such as processor utilization, based on an average value calculated from the status data of each server represented by the cell.

The generated tree map data may, for example, be generated by the status data processor 302 in a mark-up language format such as HTML or other suitable mark-up language. Use of HTML, for example, enables the tree map to be displayed on an Internet browser or other suitable visualization application. In this way, each cell may be 'clickable' and linked to a hyperlink. Additional data may also be displayed to a user of a browser, for example, by moving a mouse pointer over a particular cell.

The tree map 200 may also include selectable options (not shown), such as drop down boxes, selectable lists, radio buttons, etc., which cause the visualization module 108 to change the view of a currently displayed tree map. For example, by selecting a specific country option, the visualization module 306 may cause the status data processor 302 to generate new tree map data to show only status data from the selected country, such as the USA, with each cell being used to show data from elements in different states of the USA.

However, current tree map visualization techniques only allow the visualization of static status data, such as the data gathered by the status monitor 106.

Figure 3:
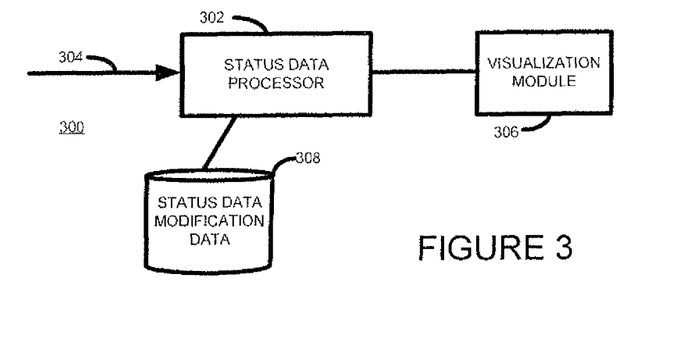
FIG. 3 is a simplified block diagram of a system according to an embodiment of the present invention.

Referring now to FIG. 3 there is shown a visualization system 300 according to an embodiment of the present invention. Further reference is made to the flow diagram of FIG. 4.

The system 300 comprises a status data processor 302 which receives or obtains (402) status data 304 from a number of system elements, such as the elements 102 and 104 shown in FIG. 1. Example status data 304 is shown below in Table 1. Those skilled in the art will appreciate that the received status data is not limited to the fields shown below and that a lesser or greater number of fields, or different fields, may be received or obtained as required.

TABLE 1

Example Status Data

| STATUS DATA | VALUE |
| --- | --- |
| Sever Name | PALO_ALTO_SERVER_1 |
| Status Data Timestamp | Jan. 3, 2010 09:46:12 |
| Processor Utilization | 62% |
| Memory utilization | 75% |
| Number of threads | 214 |
| Location Code | USA_PALO_ALTO_B20 |
| Operational Status | RUNNING |
| Element Type | SERVER_HPUX_1234_V2 |

In one embodiment the status data processor 302 pre-processes (404) the received status data. Pre-processing of the data may include, for example, consolidation of the received data, correlation, formatting of the received data, normalization of the received data, or any other suitable pre-processing operation as may be required, depending on the nature of the received status data. Consolidation of the data may include, for example, grouping received status data, for example, based on a location code of the elements, filtering data or selecting data based on timestamp information contained in the received data, filtering data or selecting data fields from a predetermined group of status data fields, grouping some of the elements based on, for example, the type of network element, and the like.

In addition to the received status data 304, the status data processor 302 receives or obtains (406) status data modification data 308. The status data modification data 308 may, for example, be stored in a data store, memory, database, file, or other suitable storage medium, or may be input to the status data processor 302 by a user through a suitable user interface such as through the visualization module 306.

The status data modification data 308 identifies one or more received status data fields and defines the manner in which the status data processor 302 modifies (408) the identified status data field. For instance, in one embodiment the status data modification data 308 may define a multiplier, a function, a mathematical operation, etc. that is to be performed on or applied to the received status data 304. For example, status data modification data 308 may cause the status data processor 302 to multiply at least some of the received status data modification data 304 by a certain factor.

Example status data modification data 308 is shown below in Table 2.

TABLE 2

Example status data modification data

| DATA TO MODIFY | MODIFIER |
| --- | --- |
| Processor Utilization | +15% |

In this example, the processor utilization field of the received status data for each system element will be increased by 15%.

The status data processor 302 applied (408) the status data modification data 308 to the received status data 304 by modifying the received status data 304 in accordance with the status data modification data 308.

The status data processor 302 then generates (408) tree map data from the modified status data.

The generated tree map data may then be passed to, made available to, or obtained by, the visualization module 306. In one embodiment the visualization module 306 may be remote from the status data processor 302 and may, for example, obtain the tree map data to display via a network such as the Internet, an intranet, a LAN, a WAN, or the like.

The generated tree map data enables the visualization module 306 to display a tree map that enables a user selectable item on the tree map, such as a button, a checkbox, a drop-down list, or the like, to be selected. Selection of the user selectable item causes the visualization module 306 to instruct the status data processor 302 to generate new tree map data based on the selected item, to enable a viewer of the generated tree map to modify the displayed tree map. For example, the visualization module 306 may display a tree map that enables a user to be able to select between a tree map generated with the modified status data and a tree map generated with the unmodified received status data 304. In a further embodiment, the visualization module 306 may display a tree map that enables a viewer of the tree map to enter status data modification data 308, and to cause the status data processor 302 to generate new tree map data by applying the received status data modification data 308 to the received status data 304.

Such a system may be particularly advantageous for performing capacity planning of computer systems. Capacity planning consists of trying to determine whether a current system is suitable for meeting both current and future needs, and for determining how to timely adapt the system, for example by adding additional capacity or resources, for future needs. In large systems, for example systems having many thousands or hundreds of thousands of servers and other elements, capacity planning is a particularly complex task. However, the above-described embodiment enables a user to plan for future capacity needs in a simple and effective manner.

Figure 4:
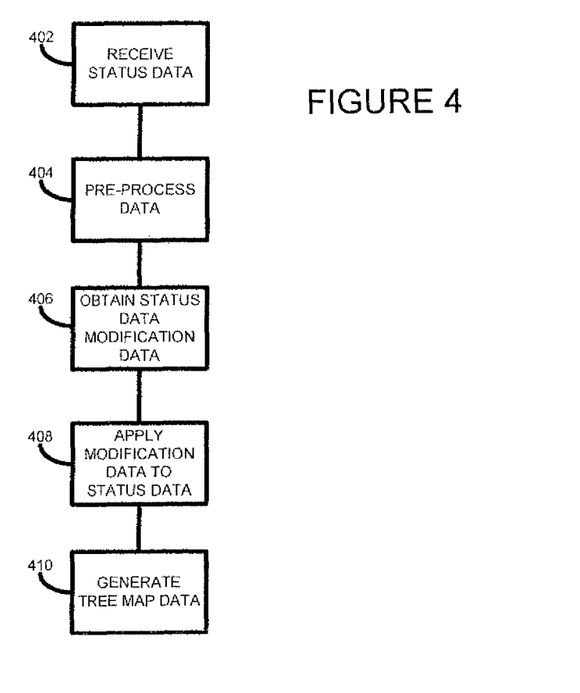
FIG. 4 is a simplified flow diagram outlining a method of operating the system of FIG. 3 according to one embodiment.

For example, a system manager may add status data modification data 308 to increase processor performance of all computer servers in the system by 20% to allow the system manager to visualize the effect of a 20% increase in server utilization. The status data processor 302 then applies (408) the 20% to the processor utilization fields of the received status data 304 and generates (410) new tree map data from the modified data.

In this way, if different colors are used on the generated tree map to show processor status of different thresholds, this enables the system manager to quickly visualize the effect a growth in processor utilization would have. For instance, a server or group of servers having an average processor utilization of 45%, shown in green on a tree map, would have an average processor utilization of 54% and be shown in orange when a 20% increase is applied. This is particularly useful tool when performing capacity planning.

Figure 5:
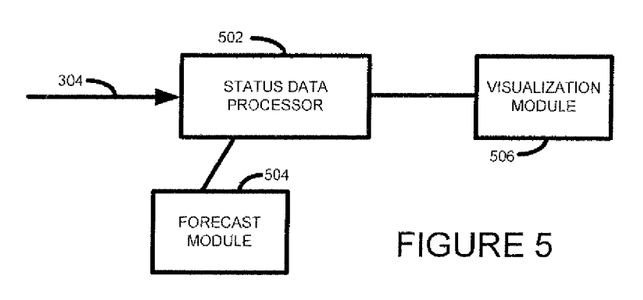
FIG. 5 is a simplified block diagram of a system according to an embodiment of the present invention.

Referring now to FIG. 5, there is shown a simplified block diagram of a system according to a further embodiment of the present invention. Operation of the system is further illustrated in the flow diagram of FIG. 6.

Figure 6:
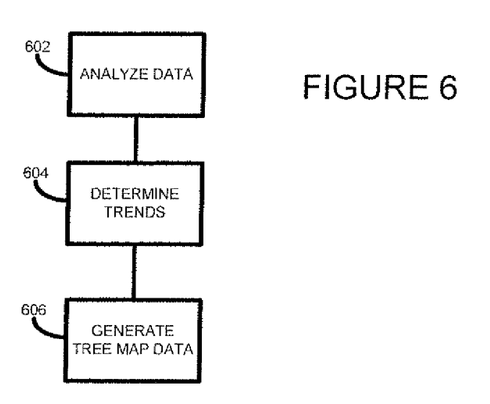
FIG. 6 is a simplified flow diagram outlining a method of operating the system of FIG. 5 according to one embodiment.

A forecast module 504 analyzes (602) the obtained status data 304 to identify or determine (604) trends in the received status data 304. Trends may be identified, for example, for individual fields of the received status data 304, or for combinations of fields.

For instance, by processing historic status data 304 received over several hours, days, weeks, months, etc, the forecast module 504 can identify trends or progressions in different data fields. For example, the forecast module 504 may process processor utilization data for all servers in a given location over a given period of time, and may infer therefrom a future trend or progression of the processor utilization of different servers or network elements. Table 3 shows example historic and projected average processor utilization for all servers located in the USA and China. Each period may, for example, represent a period of one month, or other suitable period. Periods $P_{-4}$ to $P_0$ represent historic values, and periods $P_1$ to $P_4$ represent projected values.

TABLE 3

Example forecast data

| PERIOD | AVE PROCESS UTILIZATION | |
|---|---|---|
| | USA* | CHINA* |
| $P_{-4}$ | 50 | 30 |
| $P_{-3}$ | 49 | 32 |
| $P_{-2}$ | 51 | 31 |
| $P_{-1}$ | 52 | 33 |
| $P_0$ | 54 | 32 |
| $P_1$ | 55 | 34 |
| $P_2$ | 56 | 33 |
| $P_3$ | 57 | 35 |
| $P_4$ | 58 | 34 |
| ... | ... | ... |

The forecast module 504 may determine trend data for each element, each group of elements, etc. in the system.

The status data processor 502 then generates (606) tree map data based on the forecast data for a predetermined period. For example, the status data processor 502 may generate (606) a tree map showing projected average processor utilization for all servers in all countries for a period 1 year in the future. The generated tree map data may cause the visualization module 506 to enable all determined trend data to be displayed sequentially, for example by enabling a user to select which future periods to show, or by cycling through all of the projected trend data. The visualization module 506 may additionally enable a future date to be selected and may supply this date to the status data processor 502 to cause new tree map data for that date to be generated.

In a further embodiment the status data processor 502 may generate tree map data in which the colors of each cell represent the rate of change of one or more characteristics. For instance, a cell may be shown in red when the rate of processor utilization growth is above 20% over a predetermined period. When the tree map data is displayed this helps a system manager quickly see which servers are experiencing rapid growth and which may need to be identified for upgrade to be able to cope with the increase growth.

In this way, an operator visualizing the tree map can quickly observe at what point in time in the future different elements or groups of elements of the system may, or are likely to, become overloaded. This may be achieved, for example, by observing the color of each cell. This is extremely advantageous for a system manager who needs to plan when upgrades to the system should be made. In large organizations and enterprises capacity management is crucial in maintaining the integrity of a system. Furthermore, increasing capacity of a system requires considerable foresight since the lead times for ordering additional equipment and scheduling installation of the new material is typically in the order of many months.

Figure 7:
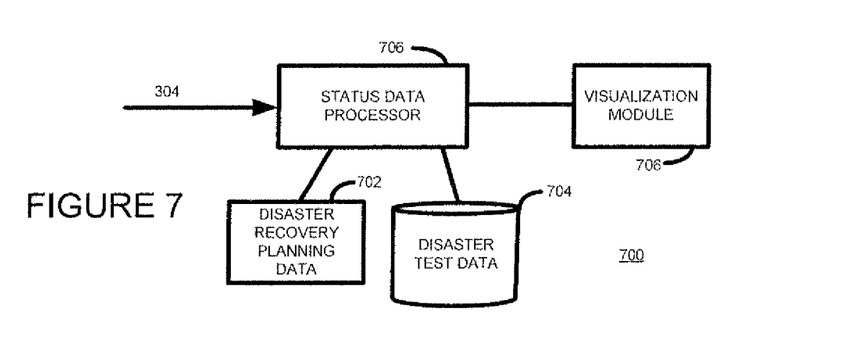
FIG. 7 is a simplified block diagram of a system according to an embodiment of the present invention.

Referring now to FIG. 7, there is shown a simplified block diagram of a system according to a further embodiment of the present invention for performing disaster recovery simulation. Operation of the system is further illustrated in the flow diagram of FIG. 8.

The system 700 comprises disaster recovery planning data 702 which comprises details of disaster recover actions to be taken in the effect of the failure of one or more of the system elements. The disaster recovery planning data 702 may, for example, be based on actual disaster recovery plans applicable to the system of elements. For example, the disaster recovery planning data 702 may define that in the event that the servers in location USA_PALO_ALTO_B20 become unavailable that the applications and tasks previously running on those servers are to be moved to one or more backup servers in a different location, such as USA_ROSEV_B2. The disaster recovery planning data 702 may be defined on an element by element basis (e.g. if server PALO_ALTO_S-ERVER_1 becomes unavailable use backup server ROSEV_SERVER_23), on a location by location basis (e.g. if servers in USA_PALO_ALTO become unavailable use backup servers in ROSEV_), or in any other suitable manner.

The system 700 also includes disaster test data 704. The disaster test data 704 may, for example, be stored in a data store or memory 704 and may be updated or input, for example, through an application or browser used to visualize a tree map generated by the visualization module 706.

The disaster test data 704 is used for modifying the received status data 304 to simulate the effect a disaster or system degradation on a portion of system elements would have on the other system elements. For example, the disaster test data 704 may define that all of the servers in location USA_PALO_ALTO are unavailable, or have a reduced capacity. The disaster test data 704 may define, for example, that all of the servers in location CHINA are unavailable, or that all of the servers in location FRANCE_PARIS are running with 50% reduced capacity.

Figure 8:
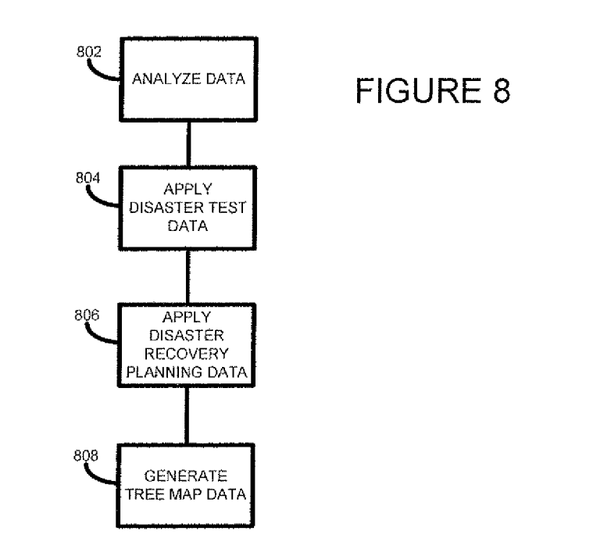
FIG. 8 is a simplified flow diagram outlining a method of operating the system of FIG. 7 according to one embodiment.

The status data processor 706 processes (802) the received status data 304, and applies (804) the disaster test data 704 to the received status data 304 and then applies (806) the disaster recovery planning data 702 to generate (808) new tree map data. For example, if the disaster test data 704 defines that the servers in the location USA_PALO_ALTO are 'unavailable' the status data processor 706 will process to the received status data 304 to reattribute the load on those servers (e.g. the applications and the tasks running thereon) to those servers in accordance with the disaster recovery planning data 702.

For example, if the servers in location USA_PALO_ALTO are running at an average of 50% capacity, and their load is transferred to a group of similar servers in location USA_ROSEV running at an average of 25% capacity, the status data processor 706 will estimate the new load on the servers in location USA_ROSEV to be case 75%.

The status data processor 706 determines new capacity status data for each backup affected server. The visualization module 706 displays a tree map using the generated tree map data enabling the effect of applying the disaster test data 704 on the status of the different system elements to be visualized. For example, this may cause the visualization module 306 to show the USA_ROSEV cell in red where the new estimated load is 75%.

in a further embodiment, the status data processor 706 generates tree map data which, when displayed by the visualization module 706, enables a user to select one or more cells and to enter disaster test data 704 to be applied to that cell. For instance, a user may select the cell showing servers in location USA_PALO_ALTO, for example by activating a context-sensitive menu, and may modify the capacity status or availability status thereof. For example, the tree map may enable a user to select the cell USA_PALO_ALTO and to enter disaster test data of 'Operational_Status=down', to simulate the failure of servers having the location code USA_PALO_ALTO.

In this way, a system manager may comprehensively test disaster plans by simulating the whole or partial failure of one or more elements in the system, and by visualizing the affect of the failure on other elements in the system. This may help a system manager improve disaster recover plans, for example, by enabling identification of locations or servers which have spare capacity and which may be suitable for allocating as backup servers.

Similarly, such a system may help a system manager identify backup locations which may not have sufficient capacity to act as backup locations. In such circumstances, the system manager may modify the disaster recovery planning data 702 to test using a different backup location. A system manager may then modify the actual disaster recovery plans used in the system, based on the simulation, to ensure that such disaster recovery plans may be executed effectively. Furthermore, such a system may enable a system manager to determine which elements in which locations would benefit from having additional capacity added thereto.

Figure 9:
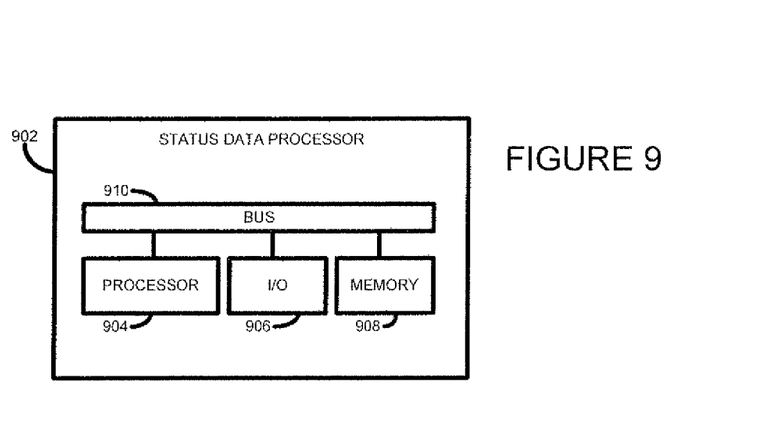
FIG. 9 is a simplified block diagram of a status data processor according an embodiment of the present invention.

An embodiment of a status data processor 902 is shown with reference to FIG. 9. The status data processor 902 may comprise, for example, a micro processor or micro controller 904 for executing machine readable instructions stored in a memory 908. Input and output operations may be handled by an I/O interface 906. The processor 904, I/O interface 906, and memory 908, are coupled via a bus 910.

Although the above-described embodiments are primarily described with reference to processing status data received from computer systems or networks, those skilled in the art will appreciate that those embodiments are in no way limiting. For example, in a yet further embodiment the status data processor 302 or 502 receives and processes data other than data relating to status data of elements of a computer system of network.

For example, in one embodiment the received status data 304 relates to infectious or contagious disease, as shown below in Table 4.

TABLE 4

Example Status Data

| STATUS DATA | VALUE |
|---|---|
| Disease_Type | H1N1 |
| Location Code | USA_PALO_ALTO |
| Transmission Index | 4 |
| Reported Cases | 1230 |
| Incubation Period (days) | 15 |
| Infection Severity Index | 2 |
| ... | ... |

Such status data may be collected by a local health authority, for example, for different diseases for different areas.

Example status data modification data is shown below in Table 5.

TABLE 5

Example status data modification data

| DATA TO MODIFY | MODIFIER |
|---|---|
| Processor Utilization | +15% |

The status data processor 302 or 502 may generate tree map data that enables users, such as health workers, to visualize the status of one or more infectious or other diseases or ailments in one or more locations. For example, if disease status data is available for each town or region of a country, a health worker may visualize via a tree map the current status of the disease over the whole country or a part thereof. Furthermore, by providing status data modification data 308 enables the health worker to visualize the effect of increased infection, as specified by the status data modification data 308.

In a further embodiment the forecast module 504 may determine projected or trend data based on analysis of the received status data 304. In this way, the status data processor 302 or 502 may generate tree map data to enable health workers to visualize, via a tree map, the projected or estimated progression of the disease at a specified future date. This may be particularly useful in the monitoring of infectious diseases enabling health workers to better plan how to deal with an outbreak of a disease. For example, using the above-described techniques may enable health workers to estimate where and when hospital beds may need to be made available to deal with the consequences of such an outbreak. Furthermore, such a system may be of particular help to health workers to prioritize where and when a vaccination program, for example, should be put in place to help prevent the spread of the disease.

In other embodiment the received status data and status data modification data may relate to any other suitable status data, such as sales data, manufacturing data, product failure data, reported crime data, weather data, road traffic data, human migration data, and the like.

In some embodiments the visualization modules 306, 506, and 706 may be implemented as machine readable instructions stored in the memory 908 and executed by the processor 904.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A computer system for processing data relating to elements of a network comprising:
a processor adapted to execute stored instructions; and
a memory device that stores instructions for execution that when executed by the processor cause the processor to:
receive status data relating to elements of the network;
analyze the received status data;
determine trend data;
obtain status data modification data that defines a modification function to be applied to the received status data;
modify at least some of the received status data in accordance with the status data modification data and the determined trend data; and
generate tree map data based on the modified data and based on the trend data for a predetermined future data, wherein the instructions are further to cause the processor to obtain the predetermined future date from a user.

2. The computer system of claim 1, wherein the instructions are further to cause the processor to send the generated tree map data to a tree map visualization application.

3. The computer system of claim 2, wherein to generate tree map data, the instructions are further to cause the processor to generate tree map data in hypertext mark-up language, and wherein to send the generated tree map data to the tree map visualization application, the instructions are further to cause the processor to send the generated tree map data to an Internet browser application.

4. The computer system of claim 1, wherein to receive the status data, the instructions are further to cause the processor to receive status data comprising a plurality of fields including at least one of: element type, element location code, element name, element processor utilization; element memory usage; operational status; and a timestamp.

5. The computer system of claim 1, wherein to obtain the status data modification data, the instructions are further to cause the processor to receive status data modification data to modify processor utilization data and wherein to generate tree map data, the processor is to generate tree map data including processor utilization data modified in accordance with the received status data modification data.

6. The computer system of claim 1, wherein the instructions are further to cause the processor to obtain disaster recovery planning data describing a backup plan for the elements of the network, and wherein the memory device stores disaster test data to modify at least some of the received status data,
wherein to modify at least some of the received status data in accordance with the status data modification data, the instructions are further to cause the processor to modify the received status data in accordance with the disaster test data and the disaster recovery planning data.

7. The computer system of claim 6, wherein to obtain disaster recovery planning data, the instructions are further to cause the processor to receive disaster recovery planning data describing how a processing load from a first element is to be transferred to a second network element when the first element becomes unavailable.

8. The computer system of claim 6, wherein the instructions are further to cause the processor to generate tree map data to cause a visualization of the effects of applying the disaster test data and disaster recovery planning data to the received status modification data.

9. The computer system of claim 6, wherein the instructions are further to cause the processor to obtain disaster test data from a user, and to modify the received status data in accordance with the received disaster test data.

10. A tangible, non-transitory machine-readable medium that stores machine-readable instructions that, when executed by a processor, cause the processor to:
receive status data relating to elements of a network;
analyze the received status data;
determine trend data;
obtain status data modification data that defines a modification function to be applied to the received status data;
modify at least some of the received status data in accordance with the status data modification data and the determined trend data;
generate tree map data based on the modified data and based on the trend data for a predetermined future date, wherein the predetermined future date is obtained from a user; and
generate and display a tree map based on the generated tree map data.

11. A method of processing status data comprising:
receiving, by a processor, status data relating to elements of a network;
analyze received status data;
determine trend data;
obtaining, by the processor, status data modification data that defines a modification function to be applied to the received status data;
modifying at least some of the received status data in accordance with the status data modification data and the determined trend data; and
generating tree map data based on the modified data and based on the trend data for a predetermined future date, wherein the predetermined future date is obtained from a user.

* * * * *